May 28, 1968  J. F. BARNETT  3,385,544
DUAL ROD AND REEL HOLDER
Filed Aug. 19, 1966
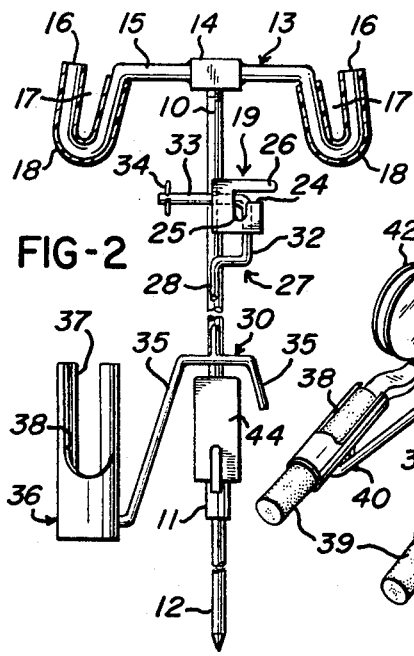
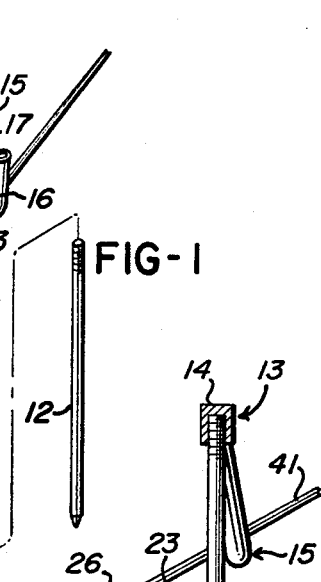
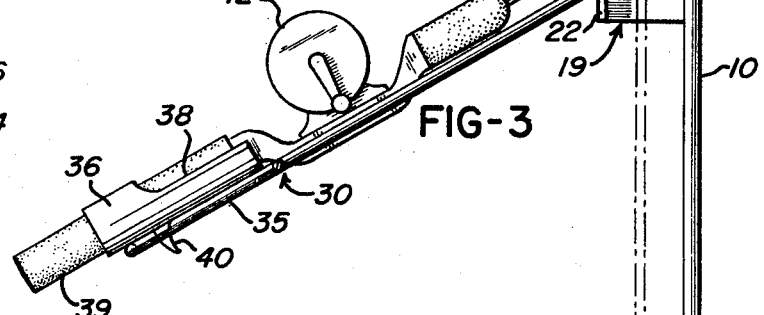
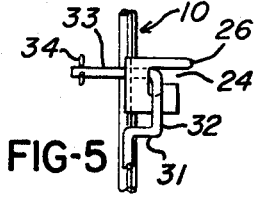
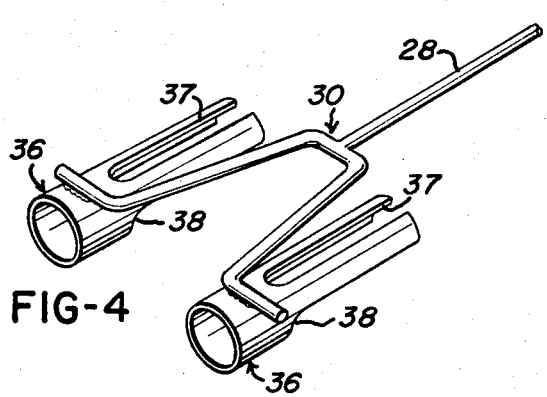
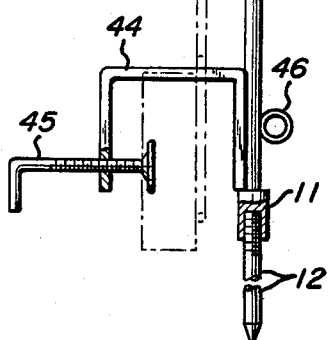
INVENTOR.
JOEL F. BARNETT
BY Jerome P. Bloom
ATTORNEY

United States Patent Office 3,385,544
Patented May 28, 1968

3,385,544
DUAL ROD AND REEL HOLDER
Joel F. Barnett, 213 Fitchland Drive,
Fairborn, Ohio 45324
Filed Aug. 19, 1966, Ser. No. 573,677
7 Claims. (Cl. 248—39)

ABSTRACT OF THE DISCLOSURE

A holding device for fishing or like rods incorporating a support member adapted for convenient upright installation in the ground or on a boat, and further incorporating angularly adjustable arm means for mounting a rod and defining a selected attitude of use.

---

This invention relates to improvements in holding devices which releasably mount fishing poles, rods or like articles of an elongated nature in a selected attitude of use. The invention has particular application to fishing equipment and will be so described. However, it should become obvious from the following that its application is not so limited.

Whether fishing from a bank of a river or from a boat, it is very tiring to constantly hold a fishing rod in a proper attitude for instant use. For this reason many devices have been previously contrived with a view to relieving this problem. They have been of various character and form. Most of them have proven to be either inadequate for the intended purpose, too cumbersome to use or carry on a fishing trip, or too costly for their purchase by the average fisherman.

The present invention is directed to alleviating the above described problem. It provides for an improved independent dual holding device for fishing rods (and reels, where required), which device is capable of retaining rods and attached reels in a proper attitude for use. The invention devices are so designed to preclude the inadvertent displacement therefrom of a rod by a fish taking the attached bait. Nevertheless they enable a rod to be readily removed for manual manipulation, when desired.

The components of the invention embodiments may be cheaply fabricated and readily assembled. They are so related to enable their immediate reduction to a compact package which may be stored in a tackle box.

A primary object of the invention is to provide an improved holding device for fishing and like rods which may be economically fabricated, more efficient and satisfactory in use, adapted to a wide variety of applications, and unlikely to malfunction.

Another object of the invention is to provide a device for securely holding fishing and like rods which may be readily carried with other fishing gear and selectively anchored on the bank of a river or readily attached to the gunwhale of a boat or a dock structure.

A further object of the invention is to provide a device for securely mounting a plurality of fishing or like rods in a side-by-side relation and in a manner to make the rods readily and selectively accessible for manual manipulation.

A further object of the invention is to provide a device for mounting fishing and like rods in a manner holding them secure against accidental dislodgment by a fish taking the attached bait.

An additional object of the invention is to adapt a holding unit for fishing and like rods having attached mechanical devices such as reels to accept the installation of a rod in a way readily to accommodate the reel and to provide for manipulation of the reel without removal of the rod from the holding device, if so desired.

A further object of the invention is to provide an improved holder for fishing and like rods possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a partially exploded view, in perspective, of a holder for fishing rods in accordance with a preferred embodiment of the present invention, the rods being illustrated as installed therein in a proper attitude for use;

FIG. 2 is a fragmentary elevation view of the holder of FIG. 1 shown partly in section and with portions thereof disposed in a non-operative position;

FIG. 3 is a side elevation view of the holder illustrated in FIG. 1, parts being broken away for clarity of disclosure;

FIG. 4 is a fragmentary view illustrating the rod holding sleeves embodied in the structure of FIG. 1; and FIG. 5 is a fragmentary view of attitude control means.

Like parts are indicated by similar characters of reference throughout the several views.

In the embodiment of the invention here illustrated, the holding device includes a rigid shaft-like member 10 which serves as a principal support component. Formed on the lower end of the member 10 is an enlarged head portion 11 providing a socket which is adapted to receive, in threaded engagement therewith, a rod-like extension 12. The remote extremity of the extension 12 is pointed for earth penetration for purposes and in a manner to be further described.

At its uppermost end, the shaft member 10, as seen in FIG. 3 of the drawings, is externally threaded. It is adapted thereby for engagement in a tapped recess in the central body portion 14 of a cross bar assembly 13. The assembly 13 includes a pair of arms 15 which respectively project from opposite ends of the body portion 14 in a generally co-planar relation. Each arm terminates in a finger 16 which is bent first downwardly and then upwardly to an approximate V-shape. As so formed, each of the fingers 16 defines a pocket 17 having downwardly converging sides. Covering each of the fingers 16 is a friction or other anti-slip type sleeve 18 made of rubber or similar material.

In the present instance the arms 15 are shown to be welded to the body 14. However, they may be applied otherwise, provided in their connected relation they form integral parts of the body. Viewing the drawings, it may be seen that the cross bar assembly 13 is applied transversely of the top of the member 10. So positioned, the pockets 17 are disposed to open upwardly and at respectively opposite sides of the member 10, displaced outwardly therefrom and in a common plane inclined thereto.

A bracket 19 is attached intermediate the ends and relatively adjacent the top of the member 10. This bracket includes a plate portion 21 one end of which is coextensively welded to the member 10 and the opposite end of which mounts a right angled plate portion 22. With the assembly 13 in its properly disposed connected relation, the bracket portion 21 lies in a plane substantially at right angles thereto.

At its upper extremity the projected edge of the plate portion 22 has a finger-like projection 26. Immediately under the finger 26, the projected edge of the plate portion 22 is formed with an inwardly directed horizontal slot 24 which merges at its inner end with a downwardly directed vertical slot 25. The latter terminates short of the lower edge of the portion 22 of the bracket 19.

Note that the bracket portion 21 includes a single aperture 23 located on the general level of the slot 24 in the bracket portion 22. In the assembled relation of the illustrated holder, the aperture 23 receives one end of a pivotally related arm assembly 27. The assembly 27 has a rod-like composition and comprises an intermediate rod section 28 which terminates at one end in a right angled offset section 29 and at its other end in an integrally connected balanced crosspiece 30. The section 29 includes a short leg 31 connected immediately with and at right angles to the section 28, a projected portion 32 disposing in outwardly offset parallel relation to the section 28, and an elongated terminal leg portion 33 which is reversely bent at right angles to the portion 32 to dispose in a sense parallel to the short leg 31.

As should be obvious, the elongated leg portion 33 is slip-fit to the bracket portion 21 by projection through its aperture 23. Following this, a pin 34 may be slipped through an aperture in the projected extremity of the leg 33 to provide thereby for a lateral adjustment of the arm assembly 27 while precluding its inadvertent disengagement from the bracket 19. It will be apparent, of course, that with a lateral adjustment of the arm assembly to have the portion 32 thereof clear the bracket portion 22, the arm assembly may be pivoted in a sense vertically of the bracket as and for purposes to be further described.

The crosspiece 30 includes divergent rearwardly projected fingers 35 the extremities of which are bent outwardly to a coaxial relation. It should be here noted that the various sections of the arm assembly 27 above described lie in a common plane.

In FIG. 4 of the drawings the crosspiece 30 is shown inverted to illustrate that a sleeve 36 is welded in overlying relation to each of the coaxial extremities of the fingers 35, at right angles thereto. In each instance, the weld is located at the undersurface and adjacent the rearmost extremity of the sleeve. Forwardly of the welded support the undersurface of each sleeve includes an elongated axially directed slot 37 which opens from the end of the sleeve remote from its support. The portion of each sleeve 36 immediately above its slot 37 is cut out to form a relatively broader slot 38.

FIG. 2 of the drawings shows the arm assembly 27 pivotally connected to the bracket 19 to depend therefrom in an inoperative position. It also shows the extension 12 in a connected relation to the main support component 10. Under such circumstance, the described holder unit may be anchored on the bank of a river by means of the pointed extremity of the extension 12 being thrust into the ground to dispose the support component 10 in a generally vertical position. In the alternative, the member 12 may be removed, if so desired, and the member 10 mounted to the gunwhale of a boat by means of a clamp, 44, 45. The latter is welded to the member immediately above the expanded head 11. In any event, with the member 10 disposed in a generally vertical position the arm assembly, noting FIG. 2 of the drawings, may be laterally and bodily shifted to have the portion 32 thereof clear the projected edge of the bracket portion 22. At this point, the arm assembly 27 may be pivoted upwardly to dispose the arm portion 32 in line with the horizontal slot 24. Then, shifting the arm assembly inwardly of the slot 24 to overlie the slot 25, one may release the assembly to have it dispose at a classic inclination to the support component 10, the portion 32 thereof resting in the bottom of the slot 25 on the bracket 19. This orients each sleeve 36 in a respective spaced alignment with a relatively elevated finger 16 and, in particular, its pocket 17.

In mounting a fishing rod to the holder unit so disposed, its handle 39 is thrust inwardly of the slotted end of a sleeve 36, the underlying slot 37 accommodating and providing an abutment at its inner end for the trigger 40 which depends from the handle. By this means the handle is established in a predetermined position in which it is fixed against rotation in the sleeve. The broader slot 38 to the upper portion of the handle is so provided to accommodate the projection therethrough of a reel support which may in some instances overlie a portion of the handle per se. Once the handle is inserted in a sleeve, the connected rod portion 41 may be dropped into the aligned pocket 17 to be inherently frictionally gripped in its narrowed bottom. The frictional engagement is insured by the nature of the sleeve 18. Note that the fingers 16 are so formed that the handle of the rod cannot be inadvertently drawn therethrough by a forward pull on the rod. Note also that in the event there is extreme agitation of a rod in use, for any reason, the projection 26 on the bracket 19 precludes a ready displacement of the arm assembly which might permit it to flip in a sense upwardly to a point that a rod may shift forward and clear of the sleeve and possibly be lost.

In its established position, ready for use, the attitude of the projected arm assembly 27 is such to receive and mount the fishing rods in a classic attitude. The rods are securely held thereby and may be left relatively unattended without fear of their loss due to a fish taking the attached bait. The rod occupy positions well spaced from one another and in a manner to prevent line entanglement and to permit individual access to the rods. In this connection, the reels 42, as illustrated in the drawings, may be individually manipulated while the rods are still in place and the rods individually handled in this manner without removal from their mounted positions. On the other hand, if in use of the holding unit the working of a fish requires more extensive and careful handling of a rod, it may be lifted easily and quickly from the holder by raising the rod portion from the pocket 17 and withdrawing the handle from the sleeve in a manner believed obvious.

It should be readily apparent that the holder unit of the invention may be readily separated into its component parts including the members 10, 12, 13 and 27. This simplifies the storage and care of the invention device and enables the temporary disposition thereof in a tackle box. As a matter of fact, the assembly as shown in FIG. 2 of the drawings can also be placed in a conventional box in a manner to simplify its further use.

While in the illustrated embodiment, the holding device is shown as adapted to mount a plurality of rods, it should be readily obvious that it may be modified to accommodate a single rod, if so desired. Similarly, the assembly 13 could be modified to provide additional pockets 17 and additional fingers could be provided on the cross bar 30 to complement the pockets.

To facilitate its use for fishing the holder incorporates a stringer ring 46 on the support member 10.

Accordingly, the invention provides a very simple but highly effective and exceedingly safe holding device for fishing and like rods which may be economically fabricated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A holding device for fishing rods and articles of like configuration comprising a support member, means for mount thereof in a generally vertical position, an arm unit pivotally connected to said support member, means rigidly connected to said support member providing a pocket, said arm unit having in connection therewith means for positioning a grip portion of a fishing or like rod in a predetermined alignment with said pocket, and said pocket being formed to freely receive the projected portion of said rod whereby to orient said rod in a proper attitude for use and a bracket fixed to said support member, a portion of said arm unit having a pivotal and laterally movable connection to said bracket and providing for bodily shift of said arm unit in a sense laterally of said bracket and the connected support member.

2. A holding device according to claim 1, wherein said arm unit has a sliding connection to said bracket providing for its lateral shifting in respect thereto and said bracket being slotted to accommodate therein a portion of said arm unit to dispose said arm unit in a position of rest and at a predetermined inclination of said support member.

3. A holding device for fishing rods and articles of like configuration comprising a support member, means for mount thereof in a generally vertical position, an arm unit pivotally connected to said support member, means rigidly connected to said support member providing a pocket, said arm unit having in connection therewith means for positioning a grip portion of a fishing or like rod in a predetermined alignment with said pocket, said pocket being formed to freely receive the projected portion of said rod whereby to orient said rod in a proper attitude for use, said arm unit having the end thereof remote from the portion which pivotally connects to said support member formed with divergent fingers each of which mounts a receptacle for non-rotatively positioning a portion of a fishing rod, and said pocket providing means is constituted by a bar-like unit releasably attached transverse to said support member and incorporating a plurality of pockets, and said pivoted relation of said arm unit to said support member being provided by a connecting device adapted to orient said arm unit at a predetermined inclination to said support member, in a position of rest, aligning each receptacle with a respective pocket.

4. A dual holding device for fishing rods and articles of like configuration, including a mounting member adapted for installation in a generally upright position, and rod support means in a mounted relation to said mounting member including bar means portions of which are angled to form laterally spaced apart pockets each providing a position of rest for a portion of a fishing or like rod, said support means further including divergent finger means providing laterally spaced apart receptacles each to receive another portion of a fishing or like rod, each pocket and a corresponding receptacle being longitudinally spaced apart to engage longitudinally spaced portions of a respective fishing or like rod, said rod support means including arm means pivotally connected to said mounting member and adjustable to an angular position relative thereto, providing a selected attitude of use of the fishing or like rods.

5. A dual holding device according to claim 4 in which said arm means is pivotally connected at one end to said mounting member and extends in elongated fashion toward its other end to terminate in divergent fingers merging at their extremities with respective receptacles.

6. A dual holding device according to claim 5, characterized by a bracket secured to said mounting member and selectively engaged by said arm means intermediate its ends to hold said arm means in an attitude of use, said arm means being bodily shiftable in a lateral sense relative to said mounting member and to said bracket to engage and to disengage from said bracket.

7. A holding device according to claim 1, characterized in that said bracket serves as a fixed projection of said support member and is of a substantially right angle construction, an aperture in one angle portion thereof receiving a turned over extremity of said arm unit to provide said pivotal connection of said arm unit with said support member, said turned over extremity being elongated to allow motion of said arm unit in a lateral sense without disengagement, the other angle portion of said bracket having a slot with which an intermediate portion of said arm unit is engaged and disengaged by bodily shift of said arm unit in said lateral sense.

References Cited
UNITED STATES PATENTS

| | | | |
|---|---|---|---|
| 1,091,491 | 3/1914 | Ebur | 248—38 |
| 1,577,612 | 3/1926 | Dees | 248—38 |
| 2,628,048 | 2/1953 | McKinney | 248—42 |
| 2,900,153 | 8/1959 | Lazur | 248—44 |
| 2,912,196 | 11/1959 | Johnson | 248—42 |
| 2,981,509 | 4/1961 | Messenger et al. | 248—42 |
| 3,319,083 | 11/1965 | Asquith | 248—39 XR |
| 3,311,332 | 3/1967 | Takus | 248—42 |

JOHN PETO, *Primary Examiner.*